(12) United States Patent
Kappler et al.

(10) Patent No.: US 7,433,953 B1
(45) Date of Patent: Oct. 7, 2008

(54) METHODS AND APPARATUS FOR REDUCING ARBITRATION DELAY IN CHANNELIZED SYSTEMS BY USE OF ADDITIONAL SCHEDULING HIERARCHY

(75) Inventors: Christopher J. Kappler, Waltham, MA (US); Gregory S. Goss, Dunstable, MA (US); Andrew T. Hebb, Harvard, MA (US); Robert T. Olsen, Dublin, CA (US)

(73) Assignee: Cisco Technology, Inc., San Jose, CA (US)

( * ) Notice: Subject to any disclaimer, the term of this patent is extended or adjusted under 35 U.S.C. 154(b) by 823 days.

(21) Appl. No.: 10/422,167

(22) Filed: Apr. 24, 2003

(51) Int. Cl.
*G06F 15/173* (2006.01)
*G06F 11/00* (2006.01)

(52) U.S. Cl. .................... 709/226; 709/225; 709/228; 370/230; 370/232; 370/235; 370/236

(58) Field of Classification Search ............... 370/230, 370/232, 235, 236, 411, 412, 401, 466, 451; 455/528
See application file for complete search history.

(56) References Cited

U.S. PATENT DOCUMENTS

| | | | |
|---|---|---|---|
| 5,524,212 A | 6/1996 | Somani | 395/250 |
| 5,578,068 A | 11/1996 | Laske | 607/126 |
| 5,721,855 A | 2/1998 | Hinton | 395/394 |
| 5,745,758 A | 4/1998 | Shaw | 395/672 |
| 5,778,439 A | 7/1998 | Trimberger | 711/153 |
| 5,835,491 A * | 11/1998 | Davis et al. | 370/386 |
| 6,038,645 A | 3/2000 | Nanda | 711/141 |
| 6,237,059 B1 | 5/2001 | Dean | 711/118 |
| 6,622,217 B2 | 9/2003 | Gharachorloo | 711/141 |
| 7,065,089 B2 * | 6/2006 | Kuhl et al. | 370/395.2 |

* cited by examiner

*Primary Examiner*—Ashok B. Patel
(74) *Attorney, Agent, or Firm*—BainwoodHuang

(57) ABSTRACT

A data communications device interconnected for channelized communication overcomes the problems associated with message traffic starvation on outgoing traffic channels by forming arbitration, or speed groups of logical interfaces and allocating scheduling resources in proportion to the bandwidth attributed to each group relative to the total bandwidth of the device. Incoming messages have a transmission rate based on QOS, content type, or other constraints. A categorizer determines arbitration groups of the outgoing messages based on the transmission rate of the message. The scheduler allocates dequeue requests among the groups according to the proportion allocated to the arbitration group. A dequeue manager drains the outgoing messages from the arbitration groups at a rate in proportion to the total percentage of outgoing transmission bandwidth represented by the group by selecting a message from among the arbitration groups according to the computed proportion.

18 Claims, 6 Drawing Sheets

METHODS AND APPARATUS FOR REDUCING ARBITRATION DELAY IN CHANNELIZED SYSTEMS BY USE OF ADDITIONAL SCHEDULING HIERARCHY

BACKGROUND OF THE INVENTION

Conventional networked computer systems employ switching devices such as routers, switches, and hubs to transmit data traffic. Such conventional systems typically employ a variety of transmission line media each having a particular bandwidth, or transmission speed. Data traffic transmission by a user, typically a packet or set of packets, is likewise designated a particular transmission speed, depending on a variety of factors including QOS (Quality of Service), data type, hardware type, fee-based subscription of the user, and other criteria. In a conventional channelized switching device, a physical transmission line medium, or line, is typically subdivided into a plurality of logical interfaces, each of which is apportioned a bandwidth segment from the total bandwidth of the line. Accordingly, such a channelized switching device typically employs a plurality of logical interfaces, or channels, each interface having a particular transmission speed. In a conventional device, the transmission speeds of the different logical interfaces can vary by an order of magnitude or more.

Conventional switching devices employ a variety of known layer-1 technologies, such as SONET (Synchronous Optical Network), DS-1 (Digital Signal 1), so called DS-3 (Digital Signal 3), T1, OC-12 (Optical Carrier-12), and DS-0. Such a switching device may subdivide a physical layer-1 connection into a plurality of logical interfaces, or channels, each capable of supporting packetized user traffic according to a layer-2 protocol such as HDLC or PPP. In a switching device supporting both DS-0 and DS-3 lines, for example, a single DS-3 line may be subdivided, or channelized, into 672 DS-0 logical interfaces. Alternatively, the DS-3 line may be employed as a single logical and physical interface, or so-called clearchannel traffic stream.

In such conventional switching devices, a mix of clearchannel lines and logical interfaces (channels) typically coexist. The switch multiplexes the logical interfaces over the physical interfaces connected to the ports on the device. This configuration requires the device to switch data traffic among many lines at many different speeds according to the logical interfaces superimposed over the physical interfaces connected to ports. In a typical conventional switching device with a highly channelized configuration, there may be hundreds of thousands of logical interfaces, or flows, emanating from the device at various bandwidths, or transmission speeds. The switching device schedules and transmits message traffic among the logical interfaces to attempt to maintain utilization of the outgoing lines and reduce ingress and egress queuing of message traffic.

In a conventional switching device, the device transmits message traffic, or messages, at periodic transmission intervals according to a device speed, a line speed, and multiplexing logic in effect in the device. Efficient utilization requires that message traffic is ready for transmission for each such transmission interval in which an outgoing line is ready to transmit a message. If a message is not ready to transmit during a particular transmission interval, a void transmission gap, or so-called "bubble" is created in which no message traffic travels on the line, resulting in less than full utilization.

A conventional switching device typically employs a scheduler having scheduling logic to schedule and allocate the logical interfaces. In such a scheduled system, contenders (e.g., logical queues) are scheduled for a scarce resource (e.g., transmission lines) according to the scheduling logic. Conventional schedulers arrange traffic according to a prioritization scheme, such as size or QOS (Quality of Service) into sets or queues contending for outgoing transmission lines. In such a set, the worst-case delay for a particular message is the scenario in which all other messages drain from the queue first. This model is described in further detail in Parekh, (A. K. J. Parekh, "A Generalized Processor Sharing Approach to Flow Control in Integrated Service Networks;" MIT Laboratory for Information and Decision Systems, Report LIDS-TH-2089, February, 1992). The limit expressed by this scenario is referred to as the Parekh bounds.

The Parekh bounds, therefore, indicate the worst-case wait time for a logical queue. Scheduling logical queue traffic according to the Parekh bounds ensures that each message in the respective logical queue is not queued longer than a specified maximum, because the scheduler visits each queue with a frequency sufficient to maintain the desired speed for each entry in the queued set regardless of the ordering within the set.

SUMMARY

The conventional data switching devices suffer from a variety of deficiencies. In a conventional switching device, such channelized switches typically employ a shared bus to deliver packet data to and from the logical interfaces. The shared bus, being of finite speed, imposes a FIFO (First In First Out) ordering on the data traffic. Since the message traffic of varying speeds shares the bus, higher speed outgoing lines can become starved by the message traffic on lower speed lines because the multitude of lower speed requests inundates the bus such that the higher speed requests are not met in a timely manner. Missed transmission opportunities create void transmission gaps, or so called "bubbles" in the outgoing traffic stream that cannot be recouped. However, increasing the FIFO queue area is not optimal because the size of these FIFO queuing areas to the logical interfaces increases cost due to the need for additional high-speed memory, and also tends to increase message traffic latency time and jitter.

The present invention significantly overcomes the problems associated with logical queue (message) traffic starvation on the outgoing channels by forming arbitration groups, or speed groups of logical interfaces and allocating scheduling resources in proportion to the bandwidth attributed to each arbitration group. Incoming messages have a transmission speed based on QOS, content type, or other constraints. The switch fabric of the router performs conventional switching according to addressing for forwarding as outgoing messages. A categorizer in the scheduler determines the bounds of the arbitration groups and places the outgoing logical queue traffic into the arbitration groups based on the transmission rate of the logical queue and the transmission speed of the message. A dequeue manager drains the outgoing logical queues from the arbitration groups at a rate in proportion to the total percentage of outgoing transmission bandwidth represented by the arbitration group. When the dequeue manager informs the scheduler that it is ready for another outgoing transmission, the scheduler selects a logical queue from among the arbitration groups according to the computed proportion for transmitting a message from the selected logical queue.

For example, a so-called DS-0 (Digital Signal 0) line has a speed of 64 kbps (kilobits per second). A DS-1 (Digital Signal 1, or T1) line can carry 1.54 Mbps (Megabits per second) or 24*64 kbps. For a router having a clearchannel DS-1 flow and 24 channelized 12 DS-0 flows, the DS-1 flow represents a proportionally equal share of throughput as all of the 24 DS-0 flows. Accordingly, the scheduler allocates half of the available resources to the single DS-0 flow and the other half to the 24 DS-1 flows.

The invention provides, therefore, a method for allocating routing resources in a data communications device by classifying, in a categorizer, a plurality of arbitration groups, in which each of the arbitration groups is associated with a service level corresponding to an expected throughput, or speed of the arbitration group. The scheduler computes, for each of the arbitration groups, a relative demand of routing resources based on the service level of each of the arbitration groups, and allocates the routing resources among the arbitration groups in proportion to the relative demand of each of the arbitration groups in view of the total routing resources (bandwidth) of the data communications device. Scheduling using the arbitration groups ensures that there is always a message for transmission on the outgoing lines, thereby avoiding "bubbles" in the outgoing lines, rather than conventional approaches which inundate the FIFO output bus with lower speed requests that starve the faster lines because the high speed logical queue traffic is not ready for transmission.

Such conventional schedulers arbitrate a set of logical queues for the same resource (i.e. outgoing message bandwidth). These conventional logical queues may have widely varying speeds. In such a case, the worst-case delay for a particular logical queue is the scenario in which every logical queue has a maximum-sized packet to send before servicing of the particular logical queue in question (i.e. everybody in "line" before this queue occupies a longest-case interval). This worst-case is the Parekh bounds referred to above. If the logical queue in question is a low-speed queue, this delay is not damaging. However if the logical queue in question is a high-speed queue, then it may be delayed because of the servicing of the intermediary queues by many message transmission time intervals given the rate of the logical queue in question (i.e. since it is so fast, and drains message traffic accordingly, a relatively "short" delay from the perspective of a slower queue is seen as a loss, or "bubble" of many potential message transmissions.

Referring back to the Parekh example above, in such cases where the Parekh bounds are unacceptable due to an extreme burst limitation downstream, it is desirable to take steps to ensure that each logical queue will be served within some known burst tolerance of an ideal service time.

In further detail, the data communications device (e.g. a router) has outgoing physical ports subdivided into logical interfaces. Each port is a physical interface capable of transmitting outgoing messages according to a predetermined bandwidth, or transmission rate. The logical interfaces represent a subdivision of the bandwidth of the physical interface into multiple flows. Each of the multiple flows is typically a multiplexed channel distinguished from other flows by multiplexing techniques such as CDMA or TDMA (Code Division Multiple Access and Time Division Multiple Access), for example. The aggregated bandwidth of the physical ports determines the total bandwidth resources of the router. The categorizer organizes the arbitration groups according to the outgoing ports based on the transmission rate. A group is associated with one or more outgoing flows, typically of the same or similar transmission rates. An expected bandwidth indicates the bandwidth attributed to a group based on the flows servicing that group. The proportion of the expected bandwidth of each group relative to the total bandwidth gives the percentage of transmission resources, or outgoing bandwidth, that the scheduler will apportion to the arbitration group of logical interfaces on the particular port or ports.

In a particular configuration, the scheduler employs a hierarchical data structure operable to schedule requests for router device resources. Such resources primarily include transmission bandwidth, but also encompass other aspects such as processor cycles, queue memory area and memory access, or fetch capability, for example. Incoming messages arrive via an enqueue bus, where the data communications device stores them as enqueue requests. The scheduler schedules these enqueue requests as entries in the hierarchical data structure. At the scheduled time, as the dequeue manager dequeues the entries from the hierarchical data structure as dequeue requests for transmission. The hierarchical data structure has a plurality of levels and performs classification by defining, in the hierarchical data structure, a speed group layer to include the arbitration groups. The expected message transmission speed corresponds to the arbitration group. The classifying further involves identifying egress flows from the router, in which each of the egress flows has an egress rate, and the categorizer allocates the router transmission resources by associating each of the arbitration groups with a set of the egress flows. This additional hierarchical level stores the arbitration groups of logical queues having similar speeds so that each of the arbitration group receives a proportional share of the dequeues to enable timely transmission and avoid transmission flow starvation which causes transmission gaps, or bubbles.

The scheduler schedules, based on the allocation of resources to the arbitration groups, dequeue requests, in which the dequeue requests correspond to a particular egress flow. The scheduler services, at the scheduled time, the dequeue request via the scheduled egress flow. The scheduler then reschedules successive dequeue requests such that a scheduling rate of the dequeue requests is at least as much as egress rate. By scheduling and executing dequeues at least as frequently as the egress line transmits the scheduled messages, the scheduler avoids outgoing bubbles, or gaps on the transmission line.

The hierarchical data structure in the scheduler, in a particular configuration, includes a set of calendars and a set of queues, in which each of the logical queues corresponds to at least one of the calendars. The queues are operable to store the enqueue requests and the calendars to store the dequeue requests, and the classifying further includes identifying, for each calendar, a corresponding arbitration group. Further, the logical queues maintain a state of empty or non-empty to act as a filtering function on the enqueue requests. In turn, the calendars serve and demultiplex dequeue requests (availability for outgoing message transmission from the logical queues), to the logical queues and corresponding arbitration groups, one at a time in rapid succession depending on the speed of the scheduler.

In computing the total routing resources, one particular arrangement aggregates, or sums, the set of egress flows from the data communications device. The relative demand is further determined from an aggregation of the set of logical interface egress flows corresponding to an arbitration group.

The message traffic arrives at the enqueue manager as incoming requests in which the incoming requests have an expected service level. A categorizer selects requests by determining the expected service level of the incoming request, selects one of the arbitration groups according to the service level, and stores the incoming request in one of the queues corresponding to the selected arbitration group. In this manner, requests of the same or similar transmission speeds occupy the same arbitration group, and will receive a proportional number of the dequeue requests.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, with emphasis instead being placed upon illustrating the embodiments, principles and concepts of the invention.

DETAILED DESCRIPTION OF PREFERRED EMBODIMENTS

Figure 1:
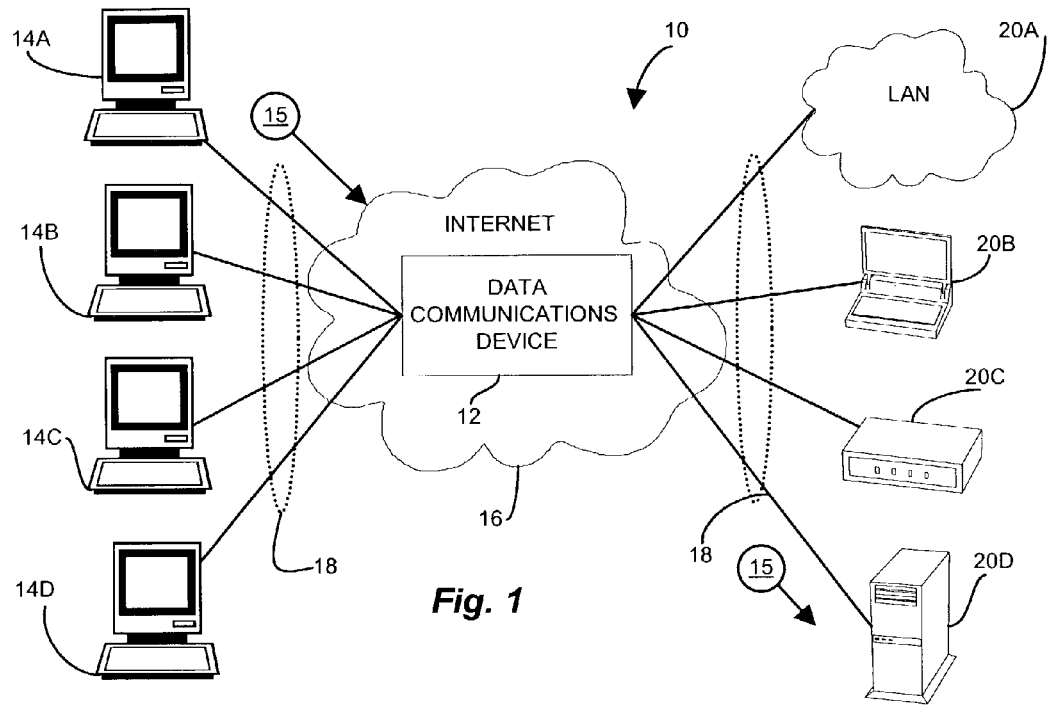
FIG. 1 is a networked computing system suitable for use in describing example operations of configurations of the invention.

The present invention provides techniques and mechanisms that form arbitration groups, or speed groups of logical interfaces, and allocate scheduling resources in proportion to the bandwidth attributed to each group. A categorizer computes and allocates a proportion of total bandwidth to each arbitration group. Incoming messages have a transmission rate based on QOS, content type, or other constraints. The switch fabric of the router switches the incoming messages according to addressing information of successive destinations of the messages for forwarding as outgoing messages. The categorizer classifies the logical queues, and hence the enqueued messages into the arbitration groups based on the intended or proscribed transmission speed of the logical queue. A dequeue manager pulls the outgoing messages from the arbitration groups at a frequency in proportion to the total percentage of outgoing transmission bandwidth represented by the group. When the dequeue manager informs the scheduler that it is ready for another outgoing transmission, the scheduler selects a logical queue from among the arbitration groups according to the computed proportion.

For example, as described above, a so-called DS-0 line has a speed of 64 Kbps. A DS-1 line can carry 1.54 Mbps or 24*64 kbps, as is known to those skilled in the art. The DS-1 line is therefore channelizable into 24 DS-0 flows. Accordingly a user elects to channelize a DS-1 line, carrying 1.54 Mbps into 24 DS-0 lines, each at 64 Kbps. In a router supporting two DS-1 lines, one channelized and one clearchannel, there are 24 DS-1 egress flows and 1 DS-1 egress flow. However, since the DS-0 line represents a proportionally equal share of throughput as all of the 24 DS-1 flows, the scheduler allocates half of the available resources to the single DS-0 line and the other half to the 24 DS-1 flows. Scheduling using the arbitration groups, therefore, schedules that the high speed lines are scheduled at a rate proportional to that which they will drain the logical queues. Such proportional scheduling ensures there is always a message for transmission on the outgoing lines, thereby avoiding "bubbles" in the outgoing lines, rather than conventional approaches which inundate the FIFO output bus with lower speed requests that starve the faster lines because many lower speed logical interfaces become available at the same time as the high speed logical queue traffic.

In further detail, the output bus carries the egress traffic to the outgoing ports, or physical interfaces. The scheduler may allocate a burst of egress traffic onto the output bus according to the scheduling logic. However, the high speed egress flows require substantially more logical queue traffic to avoid bubbles than their lower speed counterparts. Since such high speed egress lines drain outgoing traffic very quickly, even a relatively short burst of bus traffic for the lower speed lines can cause the high speed egress flows to become idle and transmit bubbles because the high speed message traffic is "stuck behind" the message traffic for the lower speed flows. Accordingly, by scheduling the higher speed logical queues at a proportionally higher rate commensurate with the ability of the high speed flows to drain traffic, it is statistically likely that the output bus will carry sufficient logical queue traffic to avoid starving the high speed flows despite an appropriate level of lower speed traffic.

Referring to FIG. 1, a networked computing system 10 suitable for use in describing example operations of embodiments of the invention is shown. The system 10 includes a plurality of user computing devices 14A-14D (14n, generally) connected to a data communications device 12, such as a switch, router, or hub, disposed on a public access network 16 such as the Internet. The network 16 provides interconnections 18 between the user computing devices 14n and network destinations 20A-20D (20n generally), including local area network (LAN) 20A, laptop 20B, switch 20C, and server 20D.

The data communications device 12 interconnects the user nodes 14n and network destinations 20n via the interconnections 18. The data communications device 12 is a switching device, and may be a switch, router, hub, or other connectivity device operable to interconnect users and destinations 14n, 20n respectively (Note the designation of user and destination is exemplary, and that generally any network node can be an originator or a destination as far as switching packets through the data communications device 12. Although only a single data communications device 12 is shown in the network 16, by way of example, it should be understood that the network is capable of including a plurality of such devices 12.

The device 12, typically a router, switches message traffic between users 14n and particular destinations 20n by selecting interconnections 18 based on destination information in the message traffic 15, typically packets. Generally, the data communications device 12 interconnects network nodes 14n, 20n via the interconnections 18, and also interconnects other nodes and routers also disposed on the network 16. As the data communications device 12 switches and forwards message traffic 15 in both directions, the distinction between users and destinations 14n and 20n are transparent to the data communications device 12; the system 10 may be defined as a plurality of interconnected (by connections 18) nodes.

In such a data communications device 12, a design heuristic goal is to maintain the outgoing logical interfaces with sufficient message traffic 15 for 100% utilization. Unutilized message bandwidth, like an unoccupied hotel room, can never be recouped. Unutilized transmission cycles, or transmission slots in a CDMA or TDMA multiplexed system, are a loss.

A frequent analogy for transmission line bandwidth is an automobile on a highway. If each car is a packet, then bandwidth increases if all cars move faster. The faster the car, the faster the payload gets from point A to point B, hence the more data that a switching device can transmit. In a channelized device, however, a train is a more appropriate analogy, as transmission cycle or slot is analogous to the multiple train cars included in the train, each of the cars corresponding to a channel. The train will leave the station at a scheduled time, whether there are 0, 50, or 100 people on board each of the cars, just as a transmission cycle or slot will occur and pass regardless of waiting message traffic 15. If there are no messages ready to be transmitted, then a null cycle or slot occurs and creates a transmission void, or bubble, indicative of unutilized bandwidth occurs.

Figure 2:
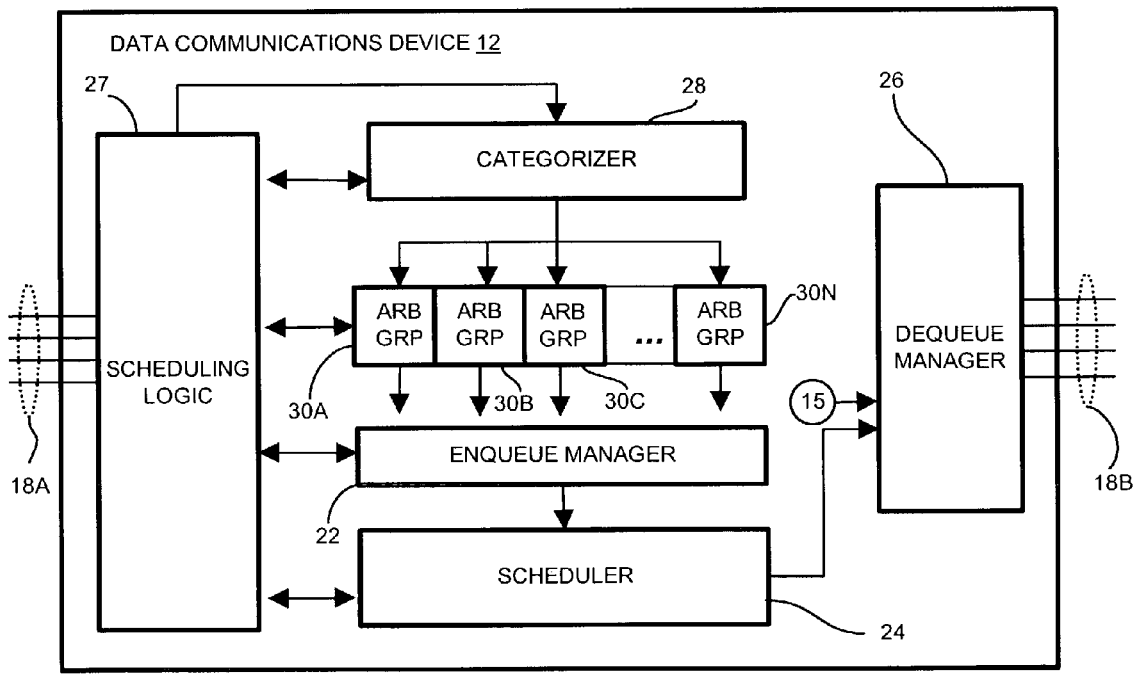
FIG. 2 shows a block diagram of the data communications device of the invention in the networked computing system of FIG. 1.

FIG. 2 shows a block diagram of the data communications device 12 in the networked computing system 10 of FIG. 1. Referring to FIG. 2, the data communications device 12 includes a plurality of ingress ports 18A and egress ports 18B coupled to the interconnections (18, FIG. 1). The device 12 further includes an enqueue manager 22, a categorizer 28, a plurality of arbitration groups 30A 30N ($30n$ generally), a scheduler 24, and a dequeue manager 26, forming a pipelined arrangement.

The ingress ports 18A and egress ports 18B connect to the network interconnections 18 according to a physical network architecture for routing message traffic 15. The enqueue manager 22 connects between the ingress ports 18A and the categorizer 28. The categorizer 28 is in communication with each of the arbitration groups $30n$. each of which connect to the scheduler 24 for scheduling incoming message traffic 15. The dequeue manager 26 connects between the scheduler 24 and the egress ports 18B for outgoing message traffic 15.

In operation, the enqueue manager 22 receives incoming message traffic 15 via the ingress ports 18A. The enqueue manager 22 sends the message traffic 15 to the categorizer 28 for routing as an outgoing transmission according to scheduling logic 27 for prioritization and resource management, described further below. As part of the scheduling logic 27, the categorizer 28 examines the message traffic 15 and classifies the messages. Each of the arbitration groups 30A-30N includes one or more logical queues operable to store messages for enqueueing by the scheduler 24 and successive outgoing transmission. The categorizer 28 stores the messages in the arbitration groups 30A-30N according to an expected transmission speed of the logical queues, also described further below. The arbitration groups $30n$ therefore delineate message traffic 15 according to the expected transmission speed of the logical queues (38A-38C, FIG. 5, below) receiving the message for transmission on the outgoing lines 18B. The categorizer 28 may also employ other factors, such as size, type, and protocol, in determining the enqueue selection of logical queues $38n$ within each of the arbitration groups $30n$.

At periodic intervals, the dequeue manager 26 retrieves messages to be sent on the egress ports 18B. When the dequeue manager 26 informs the scheduler 24 that another outgoing transmission slot is available, the scheduler 24 computes the next logical queue $38n$ from which a message is to be sent, and returns the identity of a message from one of the arbitration groups $30n$. The dequeue manager 26 retrieves the message, and forwards it on the corresponding egress port 18B.

Figure 3:
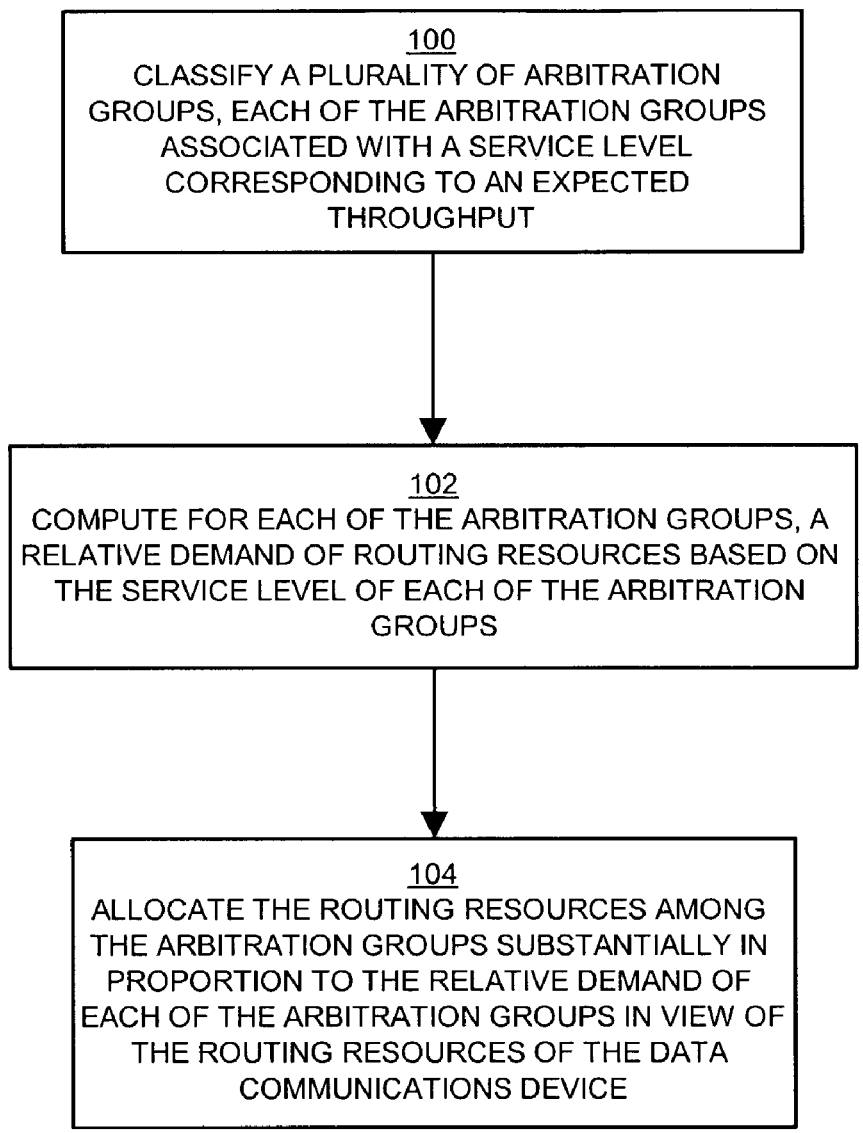
FIG. 3 shows a flowchart of a procedure for allocating logical queue traffic transmission resources in the data communications device of FIG. 2.

FIG. 3 shows a flowchart of allocating message traffic 15 transmission resources in a data communications data communications device 12 according to a particular configuration of the present invention. Referring to FIGS. 2 and 3, in step 100, the categorizer 28 classifies a plurality of arbitration groups $30n$, each of the arbitration groups $30n$ associated with a service level corresponding to an expected throughput. The categorizer 28 specifies a statistical bin criteria for the number and transmission speed range for each of the arbitration groups $30n$. The bin criteria specifies the upper and lower bounds of transmission speed of messages stored in a particular group, such that each message 15 falls into a particular "bin" depending on it's speed, described further below. Alternate configurations compute the bin determinations, demand allocation, and timing/scheduling of the routing resources according to a different sequence. Such alternate configurations may recomputed groups and allocations at configuration, at operation, or dynamically in real time, or may compute resource allocation boundaries prior to designating groups, for example. Other ordering of the exemplary sequence illustrated may be performed without deviating from the scope of the claims.

In particular arrangements, the categorizer computes the category bounds based on the maximum router system speed or by observing typical message traffic 15, discussed further below. For alternate arrangements, a user specifies the speed range for the arbitration groups $30n$. In general, a bin criterion that is overly narrow will not provide a significant variation between the groups $30n$ to justify the computation required to determine the arbitration group $30n$, while an overly broad criteria may not distribute message traffic 15 across the categories to avoid starving some arbitration groups $30n$ and creating "bubbles."

Once the categorizer 28 determines the logical queues $38n$ for each of the arbitration groups $30n$, in step 102, the categorizer 28 then computes, for each of the arbitration groups $30n$, a relative demand of routing resources based on the transmission speed, or service level of each of the arbitration groups. The categorizer 28 aggregates the capacity of the logical interfaces emanating from the data communications device 12, and allocates a portion based on the number and speed of the logical interfaces in each group. Therefore, the categorizer 28 computes, for each arbitration group $30n$, a portion of the total resources based on the ability of the logical interfaces serving the arbitration group $30n$ to drain the arbitration group $30n$ of message traffic 15. Note that the total transmission resources includes both the sum of the capacity of the egress ports 18B and the speed of the dequeue manager 26. A large number of logical interfaces may cause the egress ports 18B to drain the message traffic 15 faster than the dequeue manager 26 can dequeue logical queue entries for transmission.

In step 104, the scheduler 24 allocates the routing resources among the arbitration groups $30n$ substantially in proportion to the relative demand of each of the arbitration groups in view of the routing resources of the data communications device 12. Returning to the above example, the arbitration group $30n$ corresponding to the DS-3 line is allocated half the dequeue operations by the dequeue manager 26, since the DS-3 group $30n$ occupies half the available output bandwidth. The remaining half is allocated to the group $30n$ having the 28 DS-1 lines, since this group $30n$ can handle proportionally the same output bandwidth as the single DS-3 line.

Figure 4:
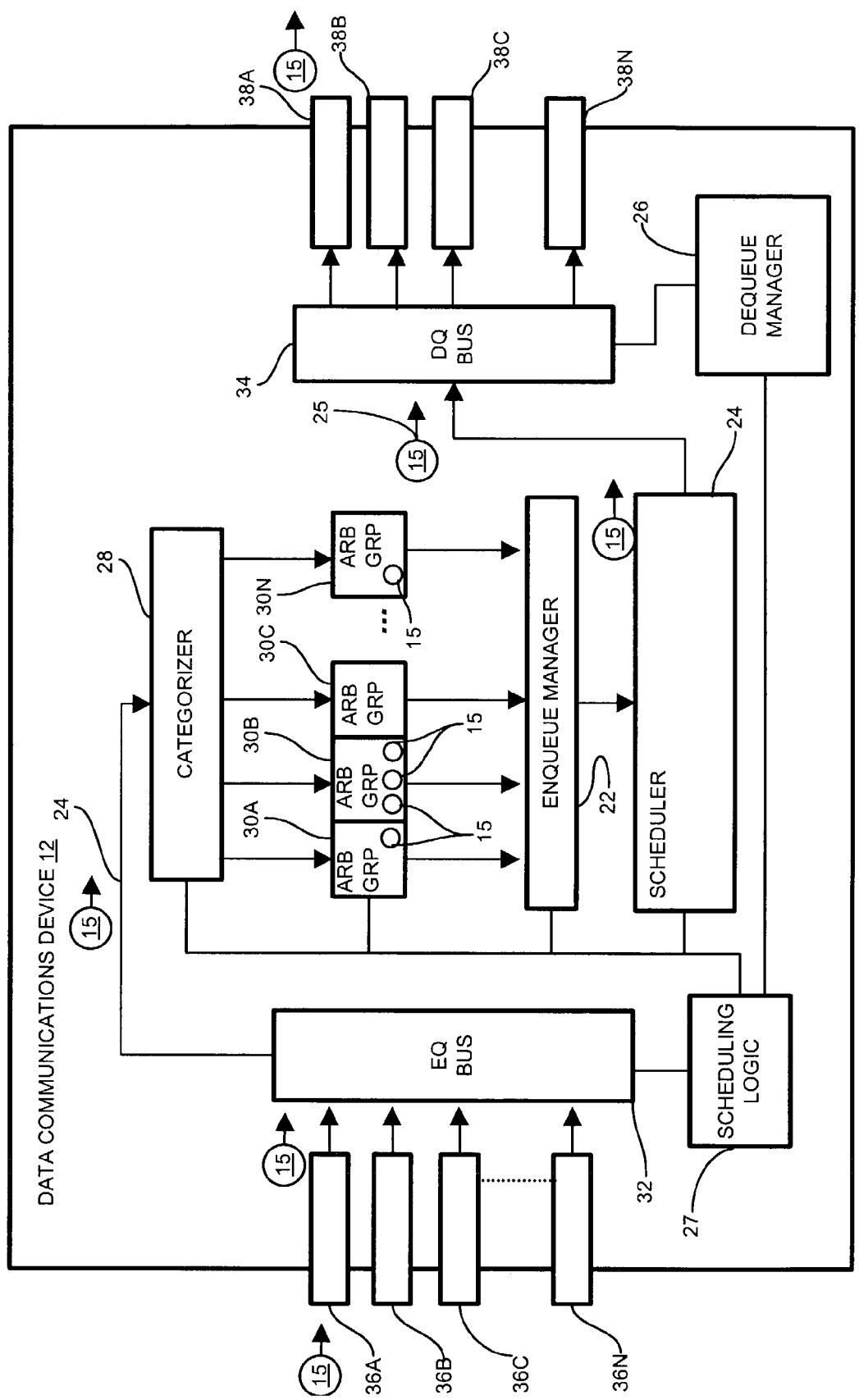
FIG. 4 shows the data communications device of FIG. 2 in greater detail.

FIG. 4 shows the data communications device 12 of FIG. 2 in greater detail. Referring to FIG. 4, the data communications device 12 further includes an enqueue bus 32 and a dequeue bus 34. Note that the enqueue bus 32 and the dequeue bus 34 typically share the same physical bank of memory (not shown), but the enqueue bus 32 and the dequeue bus 34 are shown here as separate for illustrative purposes. However, it should be noted that the enqueue and dequeue events are complementary, in that each enqueue is followed by a corresponding dequeue for a particular message. The data communications device 12 also includes a plurality of logical interfaces 36A-36N (36n generally) for ingress and a plurality of logical interfaces for egress 38A-38N (38n generally).

Continuing to refer to FIG. 4, the ingress interfaces 36n couple to the enqueue bus 32 and the enqueue manager 22. Similarly, the egress interfaces 38n couple to the dequeue bus 34 and the dequeue manager 26. As described above, the physical ingress and egress ports (FIG. 2, 18a, 18b) couple to the logical interfaces 36n and 38n respectively. A physical port 18a, 18b may either provide a clearchannel logical interface 36n, 38n, and therefore correspond to a single logical interface at the same speed as the physical port, or may be channelized into a plurality of logical interfaces 36n, 38n for subdividing the available bandwidth across multiple channels.

During operation of the data communications device 12, incoming message traffic 15 arrives on the ingress logical interfaces 36n. The scheduling logic 17 retrieves the message traffic 15 and transmits the message traffic 15 to the categorizer 28 via the enqueue bus 32. The scheduler 24 is responsible for scheduling a dequeue request 25 to forward the message to another network node. The categorizer 28 then classifies the message into one of the arbitration groups 30n, depending on the transmission speed of the message and the service level of the arbitration groups 30n. After the categorizer 28 selects a logical queue 38n, and hence an arbitration group 30n, to store the message, the enqueue manager 22 retrieves the messages 15, as directed by the scheduler 24, according to the scheduling logic 17 when it services the logical queue containing the message 15. The scheduler 24 schedules the message accordingly, discussed further below with respect to FIG. 5.

The dequeue manager 26 iteratively satisfies scheduled dequeue requests 25 of messages 15 by informing the scheduler 24 that it is ready to transmit another message 15. Note that a dequeue request 25 is simply a message 15 entry pending dequeue. The dequeue manager 26 is responsive to the scheduler and satisfies dequeue requests 25 by performing a dequeue operation (dequeue) by pulling a message 15 from an arbitration group 30n and transmitting the message via the dequeue bus 34, on the egress interfaces 38n. The scheduler 24, upon an indication from the dequeue manager 26 that it is ready for another dequeue operation, informs the dequeue manager 26 which message and hence, which arbitration group 30n to select for outgoing transmission. In a typical high-speed routing device 12, the dequeue manager 26 performs on the order of a 10-100 million dequeues per second ($10^{7-9}$/sec.) to satisfy pending dequeue requests 25, with the number of dequeues expected to rise.

In further detail, the arbitration groups 30n each have a service level corresponding to the transmission speed, or range of transmission speed, of the message traffic 15 within it. The messages are placed in the arbitration groups according to the Parekh bounds of the expected logical queue transmission speed, described above. Typically the arbitration groups are selected as a multiple of a power of 2 from a system speed, corresponding to the fastest port of the device 12. In a particular arrangement, the arbitration groups denote speed ranges of multiples of 4 four ($2^2$) of the system speed. Therefore, in a switch with an OC-12 line (Optical Carrier-12) at 622.08 Mbps, the categorizer assigns groups of system speed*$1/(2^0)$, $1/(2^2)$, $1/(2^4)$ $1/(2^6)$ ... $1/(2^{(N-1*2)})$, or 1*system speed, ¼*system speed, 1/16*system speed, 1/64*system speed, etc.

Selection of the arbitration group service level bounds and the number of arbitration groups is a system tuning parameter, which may be varied depending on the message traffic 15. As discussed above, too fine a delineation between the different groups is unlikely to differentiate traffic significantly to justify the classification process. Similarly, a large spread between the arbitration groups will result in too course a granularity of message traffic 15 and result in inoptimal allocation of resources. Arbitration group 30n ranges will be discussed further below with respect to FIG. 7.

Accordingly, a scheduling heuristic according to the presently claimed invention strives to always have a logical queue (i.e. message) waiting when a transmission cycle or slot is available for a particular logical interface 38. In the channelized device 12 described above, the high-speed clearchannel interfaces transmit, or "drain" message traffic 15 much more quickly than the lower speed characterized interfaces. Accordingly, the arbitration group (ARB GRP) 30A receives a proportional share of the dequeues from the dequeue manager 26 based on the speed of the arbitration group.

It should be further noted that the scheduling heuristic, in a particular configuration is implemented as scheduling logic 17 encoded on a CD ROM 50 or other computer program storage media operable to encode program instruction thereon. As is apparent to those skilled in the art, the encoded instructions implementing the scheduling logic 17 are deliverable by any such vehicle operable to transmit such program instructions.

Figure 5:
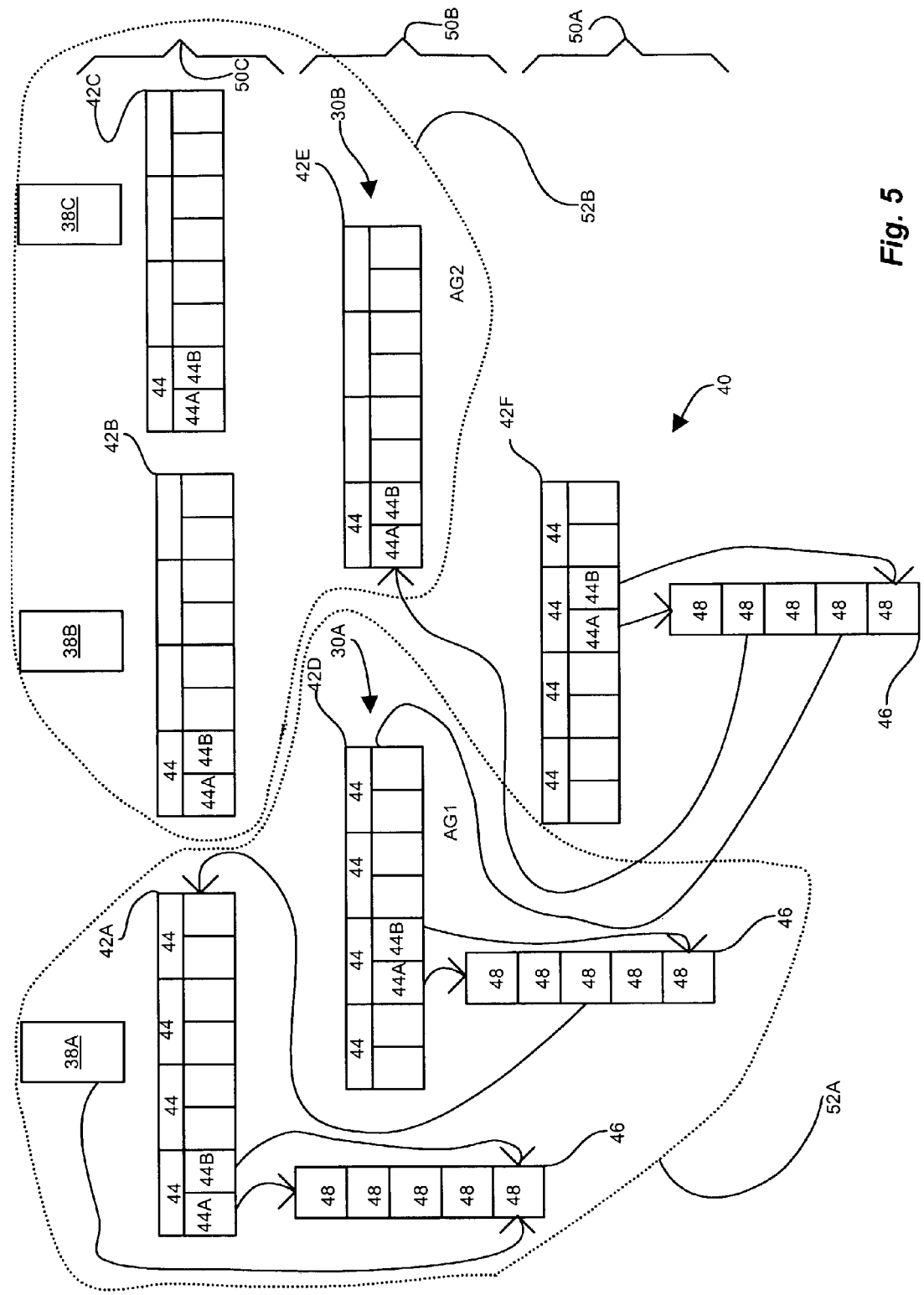
FIG. 5 shows a scheduling hierarchy in a scheduler of the data communications device of FIG. 4.

FIG. 5 shows a scheduling hierarchy 40 in the scheduler 24 of FIG. 4. In a particular configuration, the scheduler 24 employs a hierarchy of pending dequeue requests 25, as described above. Referring to FIGS. 4 and 5, a hierarchy 40 of scheduling calendars 42A-42F (42n generally) is shown, having entry lists 46 with dequeue entries 48. The hierarchy has levels 50A, 50B, 50C, of which the first level 50A is the root and the last level 50C is the leaf level and is associated with the logical interfaces 38A-38C. In this example, the arbitration group level is 50B, however, may vary in alternate arrangements depending on the overall scheduling hierarchy.

The scheduling hierarchy 40 is a data structure operable to store pending dequeue requests 25. Each calendar 42n has entry list headers 44, each with head and tail pointers 44A, 44B respectively. The entry list headers 44 point to entry lists 46 having dequeue entries 48. Note that the reference numerals do not redundantly label each similar entity for readability purposes. The scheduler 24 stores the entries 48 when the enqueue manager 22 informs the scheduler 24 of a new message arrival, and the scheduler 24 removes entries 48 via the logical interfaces 38n when the dequeue manager 26 informs the scheduler 24 that it is ready to transmit another message corresponding to an entry 48. The entries 48 point either to another calendar 42n or, in the case of the leaf level 50C, to a logical interface 38n.

The calendar hierarchy 40 arranges calendars 42n in levels 50A, 50B, 50C depending on the data communications device 12 design. The first level in the hierarchy 50A is the root level, and the last level 50C is the leaf level. The scheduler 24 typically stores new entries 48 at the root level, and removes entries 48 from the leaf level 50C via the logical interfaces 38n. The scheduler 24 defines the arbitration groups 30n on a particular level of the hierarchy, 50B in the example shown, and designates calendar entries 42n as belonging to a particular group. The data communications device 12 has a predetermined number of levels, typically four to six, depending on data communications device 12 design, of which the arbitration groups 30n occupy one level of the hierarchy. In the configuration shown, arbitration group 30A corresponds to calendar 42D, and arbitration group 30B corresponds to calendar 42E. The structure of the hierarchy defines calendars 42n on successive levels 50C from the arbitration group 30A, 30B calendars as within the arbitration group, as shown by dotted lines 52A and 52B, respectively.

When the dequeue manager 26 is available to dequeue an entry 48, the scheduler 24 selects an entry 48 from the logical interfaces 38n. The entries 48 represent dequeue requests 25 pending a dequeue operation by the dequeue manager 26. As can be seen from the hierarchy 40, each logical interface 38n corresponds to a particular arbitration group 30A, 30B. In the example shown, logical interface 38A is in arbitration group 30A and logical groups 38B and 38C are in arbitration group 30B. Therefore, a dequeue request 25 directed to a particular arbitration group 30n indicates to the scheduler 24 to select the next entry 48 from logical interfaces 38n associated with that arbitration group 30n. The dequeue manager 26, therefore allocates dequeue operations among the logical interfaces 38n according to the relative demand of the groups 30n per the categorizer 28, as described above.

The scheduling hierarchy 40 discussed above is a particular resource apportionment arrangement employing the arbitration groups 30n in a particular data structure to apportion routing resources according to the present claims. It will be apparent to those skilled in the art that alternate arrangements of implementing the arbitration groups 30n may be performed without deviating from the spirit and scope of the claimed invention, as defined by the claims below. A scheduler 24 may employ the arbitration groups 30n as a stand-alone data structure, as part of a weighted fair queuing mechanism, as part of a FIFO mechanism, or as other scheduling mechanism and/or data structures.

Figure 6:
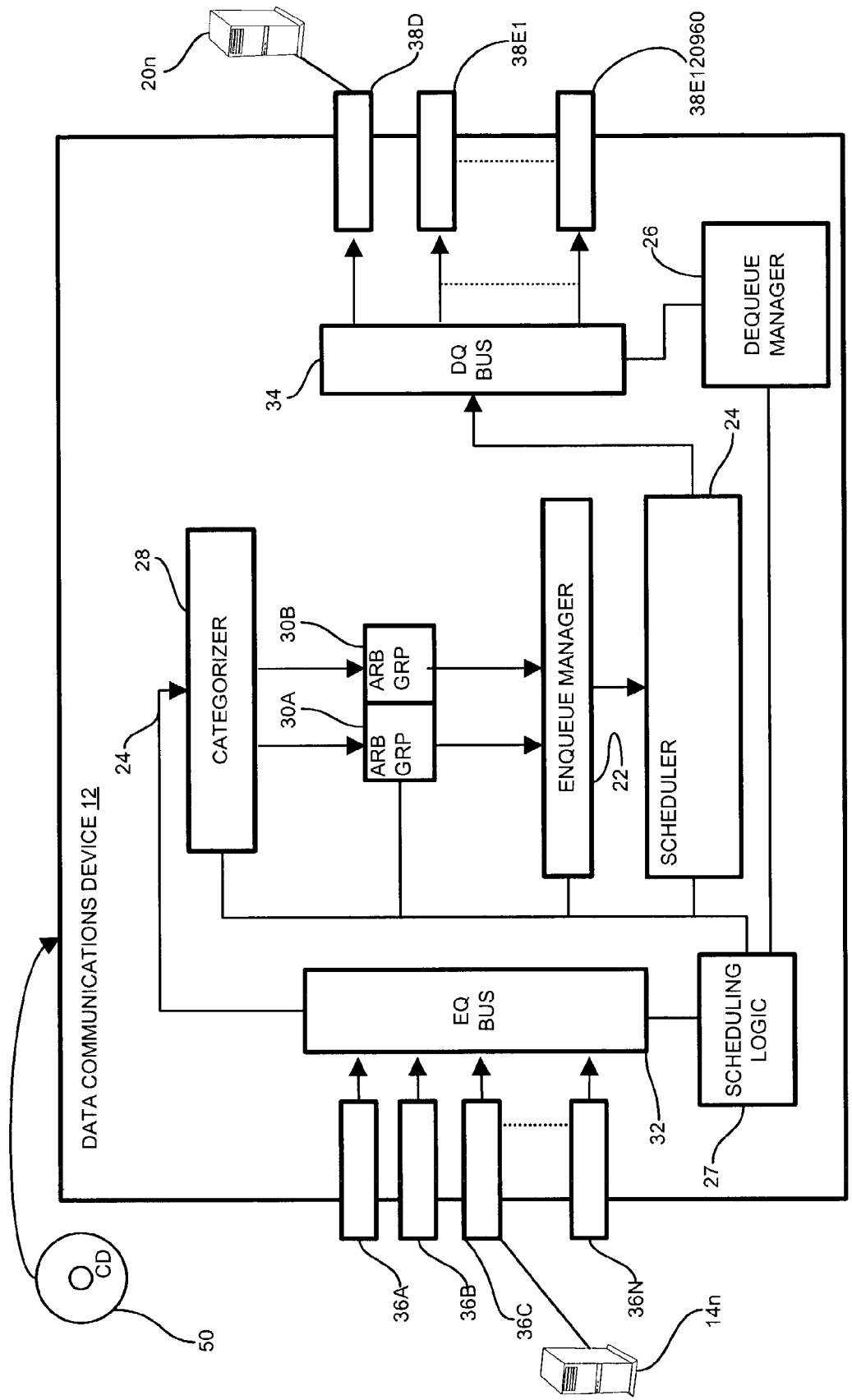
FIG. 6 shows an example of logical queue traffic scheduling using arbitration groups as defined herein.

FIG. 6 shows an example of message traffic 15 scheduling using arbitration groups 30n as defined herein. Referring to FIGS. 6 and 2, the data communications device 12 is has 16 OC-12 egress ports 18B. One of the egress ports 18B is configured as a clearchannel flow 38D. The remaining egress ports 18B are channelized into DS-0 lines, and accordingly, each OC-12 line is equivalent to 12 OC-1 lines, each of which can support 28 DS-1 lines, each further subdivided into 24 DS-0 lines, therefore each OC-1 line has 24*28 DS-0s*12 (in an OC-12)*15 egress ports=120,960~118K DS-0 virtual interfaces 38E-1-38E-120,960.

The categorizer 28 computes that the 38D interface is attributed to $\frac{1}{16}$ of the total bandwidth and the 38E interface attributed to the remaining $\frac{15}{16}$. The categorizer 28 assigns arbitration group 30A to the 38D virtual interface providing a service level of 622.08 Mbps for a clearchannel OC-12 line. The categorizer 28 then assigns arbitration group 30B to the 38E virtual interfaces. Thereafter, the scheduler 24 allocates the available dequeues of the dequeue manager 26 with $\frac{1}{16}$ (6.25%) of the dequeue requests 25 taken from arbitration group 30A, and the remaining $\frac{15}{16}$ (93.75%) of the dequeue requests 25 taken from arbitration group 30B for the 38E virtual interfaces.

Note that the examples are provided with reference to the egress queues 18B and dequeue manager 26 by way of example only. Depending on communications device 12 design, the ingress and egress queues 18A, 48B, logical interfaces 30n, and buses 32,34 may or may not share the same physical area in the device 12. The principles of the invention may be applied to the ingress queues 18A as well.

It should be further noted that the categorizer 28 classifies the message with respect to the scheduling logic 17 of the data communications device 12, implementing such classification a particular layer in the scheduling hierarchy 40, and may or may not integrate the classification with other scheduling logic variables, such as message size, message type, priority, and QOS parameters.

Figure 7:
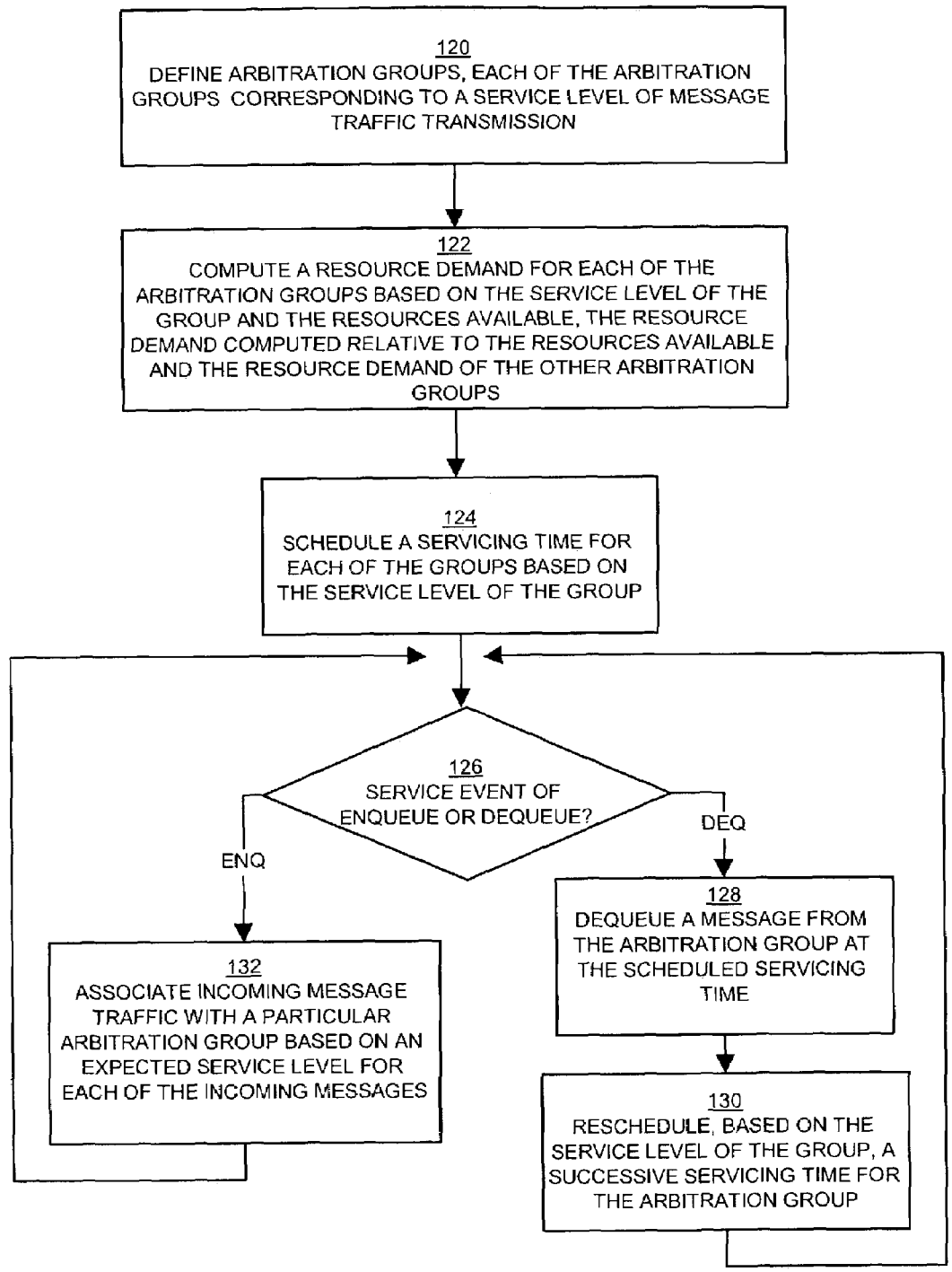
FIG. 7 shows a flowchart of a procedure performed by the scheduler of FIG. 4 in greater detail.

FIG. 7 shows a flowchart of the operation of the scheduler 24 of FIG. 4 in greater detail. Referring to FIGS. 7 and 4, at step 120, the categorizer 28 defines a plurality of arbitration groups 30n, each of the arbitration groups 30n corresponding to a service level of message traffic 15 transmission. The range of message transmission speeds within each arbitration group 30n is a tuning parameter, which demarcates boundaries by which to classify messages. As indicated above, one metric is multiples of four based on the system speed of the router. An alternate arrangement is based on order of magnitude (e.g., multiples of ten).

At step 122, the categorizer 28 computes a resource demand for each of the arbitration groups 30n based on the service level of the group 30n and the resources available, the resource demand computed relative to the resources available and the resource demand of the other arbitration groups 30n. The resource demand is the relative bandwidth of the logical interface 36n, 38n compared the total bandwidth of all logical interfaces 36n, 38n, hence of the total bandwidth of the device 12. The resources available are the number of dequeues that the dequeue manager 26 can provide per unit time (e.g. 10-100 million per sec.), hence the number of dequeue requests 25 that the dequeue manager 26 can dequeue and transmit. As indicated above, such device resources, although focusing on transmission bandwidth in the exemplary configuration, also encompass other aspects such as processor cycles, queue memory area and memory access, or fetch capability. Accordingly, the scheduling mechanism described herein is also applicable to other mechanisms for allocating scarce resources among a plurality of contenders. Therefore, the categorizer 28 apportions total bandwidth of the outgoing interfaces of the device to each group 30n by computing a proportional share of the bandwidth. At step 124, the scheduler 24 schedules a servicing time for each of the groups 30n based on the service level of the group 30n. The dequeue manager 26 informs the scheduler 24 when it is ready to handle another dequeue request 25, and in response the scheduler 24 returns the identity of the next entry (message) to be sent. Accordingly, the scheduler 24 allocates dequeues across the arbitration groups 30n in proportion to the resource demand of the arbitration group 30n. For example, an arbitration group 30n corresponding to $\frac{1}{16}^{th}$ of the bandwidth receives 1 of every 16 dequeues, while a $\frac{1}{4}$ resource demand group receives 1 of every four dequeues.

At regular intervals, events to enqueue or dequeue a message occur. At step 126, the scheduler 24 performs a check to determine if a new message arrival or a dequeue operation is occurring. A new message arrival indicates that the enqueue manager 22 is informing the scheduler 24 to queue and schedule the message in a particular arbitration group 30n. A dequeue operation indicates that the dequeue manger 26 is available to perform another dequeue to retrieve and transmit another dequeue request 25.

If an enqueue operation is occurring, at step 132, the categorizer 28 associates incoming message traffic 15 with a particular arbitration group 30n based on an expected service level for each of the incoming messages. The categorizer 28 selects the arbitration group 30n using the bin boundaries from step 120.

If a dequeue operation is occurring, at step 128, the scheduler 24 dequeues a message from one of the arbitration groups 30n at the scheduled servicing time. The scheduler 24 applies the dequeue operation to the arbitration groups 30n according to the resource demand of the group 30N. At step 130, the scheduler 24 computes the next successive servicing time for the arbitration group 30n by examining the arbitration group 30n and the resource demand corresponding to the arbitration group 30n, and the scheduler 24 reschedules a successive servicing time, based on the service level of the group 30n, and sends the identity of the messages for dequeing to the dequeue manager 26 for sending over the dequeue bus 34 to the logical interfaces 38n.

In alternate configurations, such categorization of logical queues into arbitration groups applies to other, non-channelized cases as well. The system and method described above presents the channelized case as exemplary, because such a case is particularly illustrative of the starvation of higher speed lines (i.e. the channelized lines cannot burst to catch up). However, alternate non-channelized (i.e. clearchannel) interfaces benefit as well by the above described arbitration groups, due to e.g., less buffering, smoother service, and other aspects described above. Those skilled in the art should readily appreciate that the programs and methods encoded on transport media for scheduling arbitration groups as defined herein are deliverable to a data communications device in many forms, including but not limited to a) information permanently stored on non-writeable storage media such as ROM devices, b) information alterably stored on writeable storage media such as floppy disks, magnetic tapes, CDs, RAM devices, and other magnetic and optical media, or c) information conveyed to a computer through communication media, for example using baseband signaling or broadband signaling techniques, as in an electronic network such as the Internet or telephone modem lines. The operations and methods may be implemented in a software executable object or as a set of instructions embedded in a carrier wave. Alternatively, the operations and methods may be embodied in whole or in part using hardware components, such as Application Specific Integrated Circuits (ASICs), state machines, controllers or other hardware components or devices, or a combination of hardware, software, and firmware components.

While the system and method for scheduling arbitration groups has been particularly shown and described with references to embodiments thereof, it will be understood by those skilled in the art that various changes in form and details may be made therein without departing from the scope of the invention encompassed by the appended claims. Accordingly, the present invention is not intended to be limited except by the following claims.

What is claimed is:

1. A method for allocating routing resources in a data communications device, the data communications device including a plurality of egress ports having respective line data rates, the ports including (1) an unchannelized port carrying data traffic of a first logical interface having a data rate equal to the line data rate of the unchannelized port, and (2) a channelized port carrying data traffic of a plurality of second logical interfaces having respective data rates each substantially less than the line data rate of the channelized port, the routing resources including a shared bus over which the data traffic of the first logical interface and the second logical interfaces flows to respective first-in-first-out (FIFO) buffers for the respective logical interfaces, the method comprising:

classifying the data traffic of the first logical interface and the plurality of second logical interfaces into respective first and second arbitration groups based on respective service levels, the service level of each arbitration group corresponding to an expected throughput of the data traffic of the individual logical interfaces of the arbitration group;

computing, for each of the arbitration groups, a respective demand for the routing resources based on the expected aggregate throughput of the data traffic of each of the arbitration groups; and allocating the routing resources in a hierarchical manner in which the routing resources are first allocated among the arbitration groups in proportion to the respective demand of each of the arbitration groups and then allocated within each arbitration group among the logical interfaces of the arbitration group, wherein classifying the arbitration groups includes defining, based on a hierarchical data structure operable to enqueue and dequeue requests for router resources, a speed group layer including the arbitration groups, the service level indicative of a transmission speed corresponding to the arbitration group, and wherein the speed group layer is an intermediate layer of the hierarchical data structure, the intermediate layer being disposed between a root layer and a leaf layer, the root layer including lists of dequeue entries each pointing to a calendar of the speed group layer, the speed group layer including lists of dequeue entries each pointing to a calendar of the leaf layer, and the leaf layer including lists of dequeue entries each identifying a corresponding message received by the data communications device and a corresponding one of the logical interfaces via which the message is to be transmitted.

2. The method of claim 1 wherein classifying the arbitration groups includes identifying egress flows corresponding to the first logical interface and each of the second logical interfaces on the data communications device, each of the egress flows having an egress rate, and the allocating further comprises associating the arbitration groups with a set of the egress flows.

3. The method of claim 2 further comprising:
scheduling, based on the allocating, dequeue requests, the dequeue requests being associated with a particular egress flow;
servicing, at the scheduled time, the dequeue request via the scheduled egress flow; and
rescheduling successive dequeue requests such that a scheduling rate of the dequeue requests is at least as much as the egress rate.

4. The method of claim 2 wherein allocating the routing resources of the communications device further comprises computing an aggregation of the set of egress flows from the data communications device and the relative demand further comprises an aggregation of the set of egress flows corresponding to an arbitration group.

5. The method of claim 1 wherein the hierarchical data structure further comprises a set of calendars and a set of queues, each of the calendars corresponding to at least one of the queues, the queues operable to store enqueue requests and the calendars operable to service dequeue requests, and the classifying further comprises identifying, for each calendar, a corresponding arbitration group.

6. The method of claim 1 further comprising:
receiving, at an enqueue manager, incoming requests, the incoming requests having an expected service level;
selecting, based on the expected service level of the incoming request, one of the arbitration groups; and
storing, in one of the queues corresponding to the selected arbitration groups, the incoming request.

7. The method of claim 1 wherein the channelized port includes a plurality of same-rate, time-multiplexed channels, each channel being associated with a respective one of the second logical interfaces.

8. A scheduling logic component in a data communications device, the data communications device including a plurality of egress ports having respective line data rates, the ports including (1) an unchannelized port carrying data traffic of a first logical interface having a data rate equal to the line data rate of the unchannelized port, and (2) a channelized port carrying data traffic of a plurality of second logical interfaces having respective data rates each substantially less than the line data rate of the channelized port, the data communications device including transmission resources including a shared bus over which the data traffic of the first logical interface and the second logical interfaces flows to respective first-in-first-out (FIFO) buffers for the respective logical interfaces, the scheduling logic comprising:

a controller configured to maintain first and second arbitration groups, each of the arbitration groups having a set of queues for message traffic of the first logical interface and the plurality of second logical interfaces respectively, each arbitration group being maintained based on a respective expected service level for the message traffic in the individual queues of the arbitration group;

a control hierarchy having a speed group layer, the speed group layer having control objects corresponding to each of the arbitration groups; and scheduling logic including a categorizer, the control hierarchy responsive to the categorizer, the categorizer operable to compute, for each of the control objects of the speed group layer, a respective resource allocation of the transmission resources to be scheduled for the message traffic in each of the arbitration groups, each respective resource allocation computed based on an expected service level including an aggregate throughput of the queues in the arbitration group and the expected service level including an aggregate throughput of the other queues, the computation being performed in a hierarchical manner in which the transmission resources are first allocated among the arbitration groups in proportion to the respective demand of each of the arbitration groups and then allocated within each arbitration group among the logical interfaces of the arbitration group, wherein the control hierarchy further comprises a hierarchical data structure operable to enqueue and dequeue requests for router resources, and the categorizer is further operable to define, in the hierarchical data structure operable to enqueue and dequeue requests for router resources, the speed group layer including the arbitration groups, the service level associated with each of the arbitration groups and indicative of a transmission speed corresponding to the arbitration group, and wherein the speed group layer is an intermediate layer of the hierarchical data structure, the intermediate layer being disposed between a root layer and a leaf layer, the root layer including lists of dequeue entries each pointing to a calendar of the speed group layer, the speed group layer including lists of dequeue entries each pointing to a calendar of the leaf layer, and the leaf layer including lists of dequeue entries each identifying a corresponding message received by the data communications device and a corresponding one of the logical interfaces via which the message is to be transmitted.

9. The scheduling logic component of claim 8 wherein the categorizer is further operable to classify the arbitration groups by identifying egress flows corresponding to the first logical interface and each of the second logical interfaces on the data communications device, each of the egress flows having an egress rate, and the allocating further comprises associating the arbitration groups with a set of the egress flows.

10. The scheduling logic component of claim 9 wherein the scheduling logic component is further operable to schedule, based on the allocating, a dequeue requests, the dequeue requests being associated with a particular egress flow;

service, at the scheduled time, the dequeue request via the scheduled egress flow; and reschedule successive dequeue requests such that a scheduling rate of the dequeue requests is at least as much as egress rate.

11. The scheduling logic component of claim 9 wherein the categorizer is further operable to compute routing resources comprising an aggregation of the set of egress flows from the data communications device and the relative demand further comprises an aggregation of the set of egress flows corresponding to an arbitration group.

12. The scheduling logic component of claim 8 wherein the hierarchical data structure further comprises a set of calendars and a set of queues, each of the calendars corresponding to at least one of the queues, the queues being operable to store enqueue requests and the calendars operable to service dequeue requests, and the classifying further comprises identifying, for each calendar, a corresponding arbitration group.

13. The scheduling logic component of claim 8 wherein the scheduling logic component is further operable to receive, at an enqueue manager, incoming requests, the incoming requests having an expected service level; and select, based on the expected service level of the incoming request, one of the arbitration groups; and store, in one of the queues corresponding to the selected arbitration groups, the incoming request.

14. The scheduler of claim 8 wherein the channelized port includes a plurality of same-rate, time-multiplexed channels, each channel being associated with a respective one of the second logical interfaces.

15. A method in a data communications device, the data communications device including a plurality of egress ports having respective line data rates, the ports including (1) an unchannelized port carrying data traffic of a first logical interface having a data rate equal to the line data rate of the unchannelized port, and (2) a channelized port carrying data traffic of a plurality of second logical interfaces having respective data rates each substantially less than the line data rate of the channelized port, the routing resources including a shared bus over which the data traffic of the first logical interface and the second logical interfaces flows to respective first-in-first-out (FIFO) buffers for the respective logical interfaces, the method, the method comprising:

defining first and second arbitration groups into which the data traffic of the first logical interface and the plurality of second logical interfaces is classified, each of the arbitration groups being based on a respective service level of message traffic transmission for the data traffic of the individual logical interfaces of the arbitration group;

computing a respective resource demand for the routing resources for each of the arbitration groups based on an expected aggregate throughput of the data traffic of the arbitration group;

associating incoming message traffic with a particular arbitration group based on an expected service level for each of the incoming messages;

in a first scheduling step, scheduling a servicing time for each of the arbitration groups based on the respective service levels of the arbitration groups;

dequeuing a message from the arbitration group at the scheduled servicing time, the dequeuing including a second scheduling step of scheduling a service time for each of the logical interfaces of the arbitration group; and rescheduling, based on the service level of the group, a successive servicing time for the arbitration group, wherein the data traffic of the first logical interface and the plurality of second logical interfaces is classified into the first and second arbitration groups by defining, based on a hierarchical data structure operable to enqueue and dequeue requests for router resources, a speed group layer including the arbitration groups, the service level indicative of a transmission speed corresponding to the arbitration group, and wherein the speed group layer is an intermediate layer of the hierarchical data structure, the intermediate layer being disposed between a root layer and a leaf layer, the root layer including lists of dequeue entries each pointing to a calendar of the speed group layer, the speed group layer including lists of dequeue entries each pointing to a calendar of the leaf layer, and the leaf layer including lists of dequeue entries each identifying a corresponding message received by the data communications device and a corresponding one of the logical interfaces via which the message is to be transmitted.

16. The data communication device of claim 15 further comprising performing a check for service events to determine if an enqueue operation or dequeue operation is occurring;

enqueuing, if the service event is an enqueue operation the incoming message by associating with the corresponding arbitration group; and dequeuing, if a dequeue operation is occurring, a message from the corresponding arbitration group.

17. The method of claim 15 wherein the channelized port includes a plurality of same-rate, time-multiplexed channels, each channel being associated with a respective one of the second logical interfaces.

18. A scheduler in a data communications device, the data communications device including a plurality of egress ports having respective line data rates, the ports including (1) an unchannelized port carrying data traffic of a first logical interface having a data rate equal to the line data rate of the unchannelized port, and (2) a channelized port carrying data traffic of a plurality of second logical interfaces having respective data rates each substantially less than the line data rate of the channelized port, the routing resources including a shared bus over which the data traffic of the first logical interface and the second logical interfaces flows to respective first-in-first-out (FIFO) buffers for the respective logical interfaces, the scheduler comprising:

means for classifying the data traffic of the first logical interface and the plurality of second logical interfaces into respective first and second arbitration groups based on respective service levels, the service level of each arbitration group corresponding to an expected throughput of the data traffic of the individual logical interfaces of the arbitration group;

means for computing, for each of the arbitration groups, a respective demand for the routing resources based on an expected aggregate throughput of the data traffic of each of the arbitration groups; and means for allocating the routing resources in a hierarchical manner in which the routing resources are first allocated among the arbitration groups in proportion to the respective demand of each of the arbitration groups and then allocated within each arbitration group among the logical interfaces of the arbitration group, wherein the classifying means includes means for defining, based on a hierarchical data structure operable to enqueue and dequeue requests for router resources, a speed group layer including the arbitration groups, the service level indicative of a transmission speed corresponding to the arbitration group, and wherein the speed group layer is an intermediate layer of the hierarchical data structure, the intermediate layer being disposed between a root layer and a leaf layer, the root layer including lists of dequeue entries each pointing to a calendar of the speed group layer, the speed group layer including lists of dequeue entries each pointing to a calendar of the leaf layer, and the leaf layer including lists of dequeue entries each identifying a corresponding message received by the data communications device and a corresponding one of the logical interfaces via which the message is to be transmitted.

* * * * *